(12) United States Patent
Kitagawa et al.

(10) Patent No.: US 11,209,932 B2
(45) Date of Patent: Dec. 28, 2021

(54) DISPLAY DEVICE WITH BUILT-IN TOUCH PANEL AND DRIVING METHOD THEREFOR

(71) Applicant: Sharp Kabushiki Kaisha, Sakai (JP)

(72) Inventors: Daiji Kitagawa, Sakai (JP); Jin Miyazawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/925,348

(22) Filed: Jul. 10, 2020

(65) Prior Publication Data

US 2021/0019011 A1     Jan. 21, 2021

Related U.S. Application Data

(60) Provisional application No. 62/876,047, filed on Jul. 19, 2019.

(51) Int. Cl.
*G06F 3/041*     (2006.01)
*G02F 1/1333*    (2006.01)
*G06F 3/044*     (2006.01)

(52) U.S. Cl.
CPC ........ *G06F 3/0416* (2013.01); *G02F 1/13338* (2013.01); *G06F 3/044* (2013.01); *G06F 3/0412* (2013.01); *G02F 2201/121* (2013.01)

(58) Field of Classification Search
CPC ...... G06F 3/0416; G06F 3/0412; G06F 3/044; G02F 1/13338; G02F 2201/121
See application file for complete search history.

(56) References Cited

U.S. PATENT DOCUMENTS

2012/0050217 A1     3/2012  Noguchi et al.
2017/0153736 A1*    6/2017  Kim ..................... G06F 3/0443

FOREIGN PATENT DOCUMENTS

JP     2012-048295 A     3/2012

\* cited by examiner

*Primary Examiner* — Peter D McLoone
(74) *Attorney, Agent, or Firm* — Keating & Bennett, LLP

(57) ABSTRACT

A display device can extend a pause period by using a preset second setting period as a unit when a length of the pause period exceeds the second setting period. Further, detection of a touch position and specification of coordinates are interrupted when a vertical synchronization signal is received while specifying the coordinates of the touch position, and coordinates remaining in a coordinate calculation unit are discarded.

2 Claims, 14 Drawing Sheets

DISPLAY DEVICE WITH BUILT-IN TOUCH PANEL AND DRIVING METHOD THEREFOR

BACKGROUND OF THE INVENTION

Technical Field of the Invention

The following disclosure relates to a display device with a built-in touch sensor and a driving method therefor, and more specifically, a display device with a built-in in-cell touch sensor in which a common electrode used for image displaying is also used as a sensor electrode (electrode for touch detection) and a driving method therefor.

Description of the Background Art

In recent years, a touch panel has been attracting attention as an input device for operating an electronic device such as a display device. For example, in a capacitive touch panel, the position of an object to be detected such as a finger of a user (operator) or a touch pen is detected based on a change in capacitance. Examples of such a touch panel include an "out-cell touch panel" that is used by being stacked on a display panel such as a liquid crystal panel, and a "built-in touch panel" that is integrated with a display panel. In recent years, in order to reduce the thickness and weight of electronic devices equipped with a display panel, a display device with a built-in touch panel has been developed. Such built-in touch panels are mainly classified into "on-cell touch panels" and "in-cell touch panels". In the on-cell touch panel, sensor electrodes are provided between one of two glass substrates constituting a display panel and a polarizing plate. In the in-cell touch panel, sensor electrodes are provided inside two glass substrates.

A plurality of sensor electrodes arranged on the substrate of the in-cell touch panel are used also as electrodes used for displaying an image (for example, a common electrode in a liquid crystal display device). That is, one electrode is used not only as a sensor electrode for detecting a touch position, but also as an electrode for image displaying. As described above, by using the electrode for image displaying also as the sensor electrode, the thinner and lighter electronic device has been achieved. For this reason, in-cell touch panels are becoming mainstream in the market, and are expected to be used in various applications such as mobile phones (especially smartphones), tablet terminals, personal computers, in-vehicle devices, and industrial equipment.

Regarding the present disclosure, Japanese Unexamined Patent Application Publication No. 2012-48295 discloses a display device that performs a multi-vertical blanking driving for supplying image data in which a blanking period is set at every plural rows to a display element, and that has a touch detection function of supplying a touch detection drive signal to a touch detection element in a blanking period different from a display operating period in which display scanning is performed.

Here, in order to save the power consumption of a display device, a "low frame rate driving" has been performed in which the frame rate is lowered from the standard 60 Hz to a lower frame rate. In the low frame rate driving, a normal driving period for displaying an updated image is set, and in addition, a pause period for pausing image updating is further set, which are alternately repeated.

For example, when the pause period has the same length as the normal driving period, a report rate at which a position touched by a user is transmitted to a host is reduced to half that in the case where no pause period is set. As described above, when the lengths of the normal driving period and the pause period are constant and the timing for driving the touch panel is determined, the touch position where the touch panel is touched is transmitted to the host by using the existing control integrated circuit (IC) designed to transmit a touch position to a host.

However, in low frame rate driving, a "variable low frame rate driving" may be performed in which a frame rate is changed by changing the length of a pause period for every one frame. Such variable low frame rate driving is performed when the host is changed for each frame for some reason.

When the existing driver IC is used in a display device that performs the variable low frame rate driving, the algorithm built into the control IC fails and thus the touch position by the user cannot be transmitted to the host, or it is determined that the vertical blanking period is long and thus the touch position may not be transmitted. On the other hand, users desire to minimize the reduction in the report rate even in the variable low frame rate driving.

SUMMARY OF INVENTION

Therefore, an object of the present disclosure is to provide a display device with a built-in in-cell touch sensor capable of preventing a decrease in report rate in variable low frame rate driving, and a driving method therefor.

(1) A display device with a built-in touch sensor according to some embodiments of the present invention includes a display unit displaying an image, displays an image on the display unit by low frame rate driving in which a length of a pause period is changed for each frame, detects whether or not the display unit is touched, and specifies and outputs coordinates of a touch position. The display device includes: a plurality of sensor electrodes provided on the display unit; a control unit that generates a drive signal driving the sensor electrodes and applies the drive signal to the sensor electrodes to detect the touch position of the display unit; a plurality of analog front ends that process a detection signal obtained from the sensor electrodes; and a coordinate calculation unit that is controlled by the control unit and that specifies and outputs the coordinates of the touch position based on the detection signal obtained from the analog front ends. The control unit repeats the detection of the touch position at a predetermined interval until a vertical synchronization signal is input in the pause period.

With such a configuration, since the detection of the touch position is repeated at a predetermined interval until the vertical synchronization signal is input in the pause period, it is possible to prevent an abnormal operation from occurring even when the pause period is extended.

(2) In addition, according to some embodiments of the present invention, in the configuration of the above (1), the control unit interrupts the pause period to transition to a normal driving period for displaying an updated image when the vertical synchronization signal is received in the pause period, and causes the updated image to be displayed based on image data received following the vertical synchronization signal.

With such a configuration, when the vertical synchronization signal is received in the pause period, it is possible to interrupt the pause period to transition to the normal driving period, and thus to display the updated image.

(3) In addition, according to some embodiments of the present invention, in the configuration of the above (2), the control unit sets the length of the pause period to a predetermined period in advance and extends the pause period by repeating the extension of the pause period by using the predetermined period as a unit when the vertical synchronization signal is not received even after the predetermined period has elapsed.

With such a configuration, it is possible to extend the pause period by using a preset predetermined period as a unit when the length of the pause period exceeds the preset predetermined period. Thus, it is possible to extend the pause period any number of times without receiving the vertical synchronization signal in the pause period.

(4) In addition, according to some embodiments of the present invention, in the configuration of the above (3), the control unit interrupts the detection of the touch position by the sensor electrodes and the specifying of the coordinates when the vertical synchronization signal is received while specifying the coordinates of the touch position, and discards data regarding the specified coordinates remaining in the coordinate calculation unit.

With such a configuration, detection of a touch position and specification of coordinates are interrupted when a vertical synchronization signal is received while specifying the coordinates of the touch position, and data regarding coordinates remaining in the coordinate calculation unit are discarded. In this way, it is possible to prevent the occurrence of abnormal operation.

(5) In addition, according to some embodiments of the present invention, in the configuration of the above (4), the control unit determines that there is a transition from the normal driving period to the pause period when it is determined that a period from when the normal driving period has elapsed until the vertical synchronization signal is input is longer than a preset period.

With such a configuration, the transition is automatically performed from the normal driving period to the pause period when it is determined that the period from when the normal driving period has elapsed until the vertical synchronization signal is input is longer than the preset period. This makes it possible that the transition is smoothly performed from the normal driving period to the pause period.

(6) A driving method for a display device according to some embodiments of the present invention is a driving method for a display device with a built-in touch sensor. The display device includes a display unit displaying an image, displays an image by low frame rate driving in which a length of a pause period is changed for each frame, detects whether or not the display unit is touched, and specifies coordinates of a touch position. The method includes detecting the touch position at a predetermined interval until a vertical synchronization signal is input, in the pause period, and setting the length of the pause period to a predetermined period in advance and extending the pause period by repeating the extension of the pause period by using the predetermined period as a unit when the vertical synchronization signal is not received even after the predetermined period has elapsed.

With such a configuration, the same effect as in the case of the above (3) can be obtained.

(7) In addition, according to some embodiments of the present invention, in the configuration of the above (6), the method further includes stopping the detection of the touch position by a plurality of sensor electrodes provided on the display unit, when the vertical synchronization signal is received while detecting the touch position and specifying the coordinates, and discarding the coordinates remaining in a coordinate calculation unit.

With such a configuration, the same effect as in the case of the above (4) can be obtained.

These and other objects, features, aspects and advantages of the present invention will become more apparent from the following detailed description of the invention with reference to the accompanying drawings.

DESCRIPTION OF THE PREFERRED EMBODIMENTS

<1. Basic Review>

Figure 1:
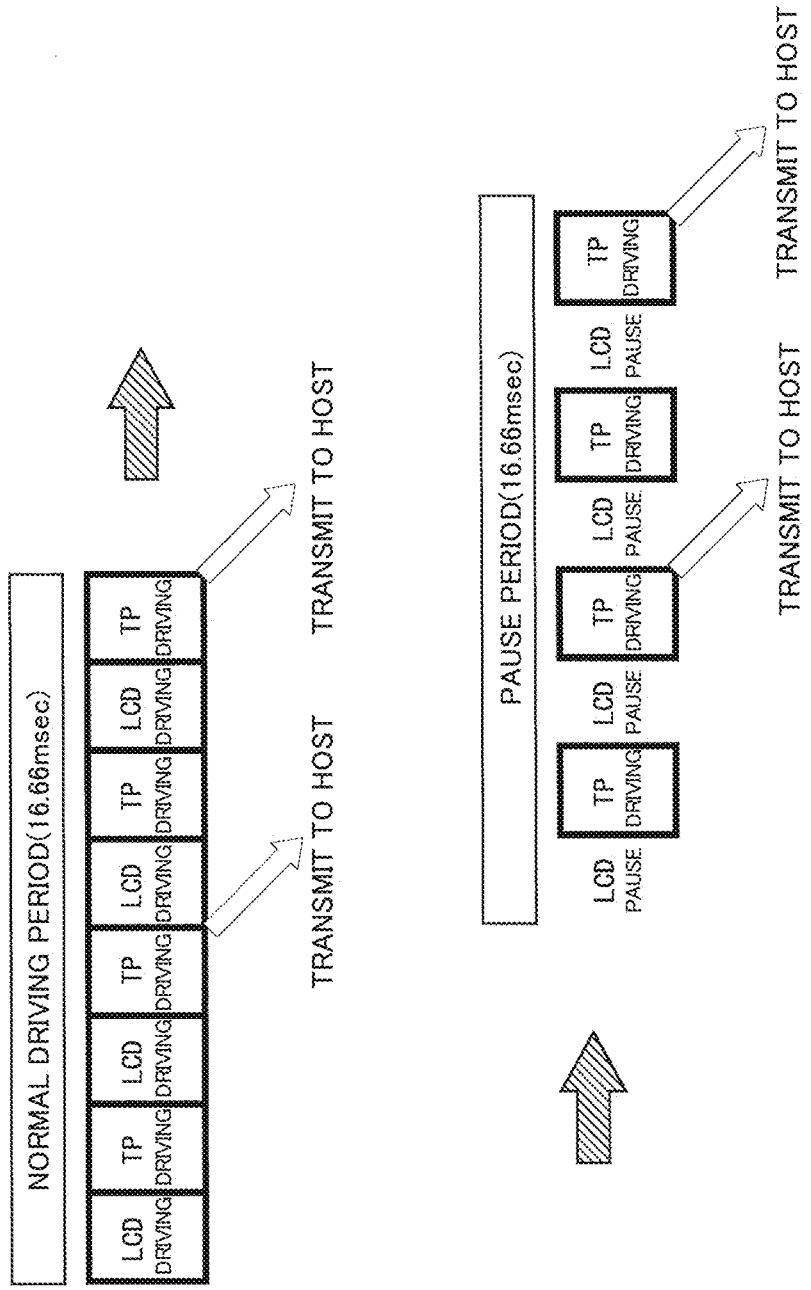
FIG. 1 is a diagram for describing a report rate at which a touch position by a user is transmitted to a host in a low frame rate driving in the related art in which a length of the pause period is constant.

FIG. 1 is a diagram for describing a report rate at which a touch position by a user is transmitted to a host in a low frame rate driving in the related art in which a length of the pause period is constant. As shown in FIG. 1, after the normal driving period, a pause period having the same length as the normal driving period is set. Since an image is updated at 60 Hz, the lengths of the normal driving period and the pause period are both 16.66 msec.

The normal driving period includes an LCD driving period in which a display panel is driven (also referred to as "LCD driving") to display an image and a TP driving period in which the touch panel is driven ("TP driving"). For example, as described below, the LCD driving period and the TP driving period have the same length, and the LCD driving and the TP driving are alternately repeated four times in each normal driving period. Therefore, the lengths of the LCD driving period and the TP driving period are both 2.08 msec. Further, since the touch position is transmitted to the host once every time the TP driving is performed two times, it is transmitted twice for each normal driving period.

Further, in the pause period, the image is not updated, and thus LCD driving is not performed and only TP driving is performed four times. That is, each pause period includes an LCD pause period in which driving of the display panel is paused (LCD pause) and an image is not displayed, and a TP driving period in which the touch sensor is driven (TP driving). Since the touch position is transmitted to the host once every time the TP driving is performed two times, it is transmitted twice for each pause period.

In this case, the report rate from the normal driving period to the pause period is 120 Hz as shown in the following equation (1), which is the same as when the pause period is not set.

$$1/((16.66+16.66)/4)=120 \text{ Hz} \qquad (1)$$

In the specification, the LCD driving and TP driving in the normal driving period are collectively referred to as "normal driving", and the LCD pause and TP driving in the pause period are collectively referred to as "pause driving".

Further, in the specification, one frame is described as including two LCD driving periods and two TP driving periods, but may include three or more of respective driving periods.

However, when using the existing control IC for driving the touch panel for the low frame rate driving, the length of the pause period is limited to an integral multiple of 16.66 msec, and it is not assumed that the length changes for each pause period. Therefore, when the existing control IC is used even when the length of the pause period changes for each pause period, the algorithm may fail and the control IC may operate abnormally. The following cases are conceivable as such abnormal operation cases.

First, a case where the pause period is shorter than 16.66 msec, for example, a case of 10 msec will be described. In this case, since the TP driving is performed only twice in the pause period of 10 msec, the touch position is transmitted to the host only once. Therefore, the control IC is highly likely to operate abnormally.

When the pause period is 3 msec, which is shorter than that in the above case, the vertical synchronization signal is input in the first TP driving of the pause period, and a transition is performed from the pause period to the normal driving period. As a result, since the TP driving is interrupted, the touch position is not transmitted to the host, and the control IC is highly likely to operate abnormally. As described above, in each of the above two examples, the control IC is highly likely to operate abnormally.

Further, when the vertical synchronization signal is not input within a predetermined period after the fourth TP driving period ends in the pause period, the pause period continues without switching to the normal driving period. In this case, since the TP driving is performed four times, the touch position is also transmitted two times. For this reason, it is highly likely that abnormal operation does not occur even when the control IC is used, and that the pause period continues until the vertical synchronization signal is input.

In the specification, for convenience of description, the LCD driving period and the TP driving period are described as being the same length of period, but may be different lengths of period. Further, the LCD driving and the TP driving are performed four times each in one display update period, but it is sufficient that they are alternately repeated, and the number of times is not limited to four. In addition, notification of the report to the host will be issued once every time TP driving is performed twice. This corresponds to the fact that the touch panel is divided into two regions, top and bottom or left and right, and TP driving is performed for each divided region. However, when the touch panel is divided into three or more regions, the report rate at which the host is notified is to be changed accordingly.

<2. Detection Principle of In-Cell Touch Panel>

Figure 2:
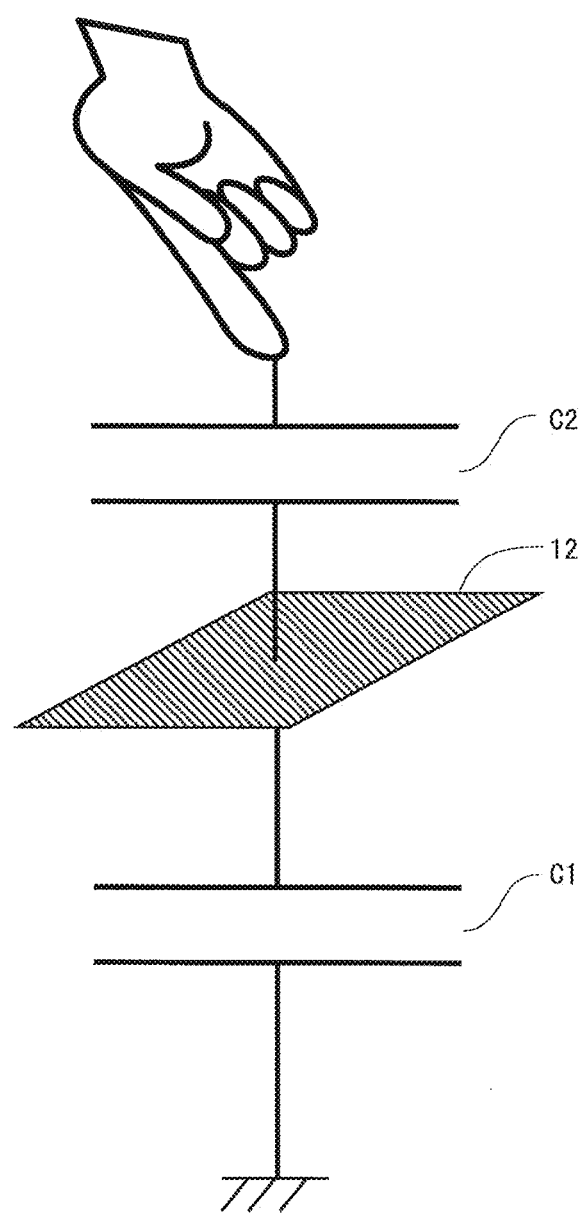
FIG. 2 is a diagram showing a detection principle of an in-cell touch panel.

FIG. 2 is a diagram showing a detection principle of an in-cell touch panel. As shown in FIG. 2, a capacitance C1 is formed between a sensor electrode 12 and a reference potential. When a finger of a user approaches the surface of the display panel, a parasitic capacitance C2 connected in series with the capacitance C1 is further formed between the sensor electrode 12 and the user's finger. In this case, the capacitance C1 changes under the influence of the parasitic capacitance C2. The display device can detect the touch position of the user by continuously measuring the change in the capacitance C1.

Figure 3:
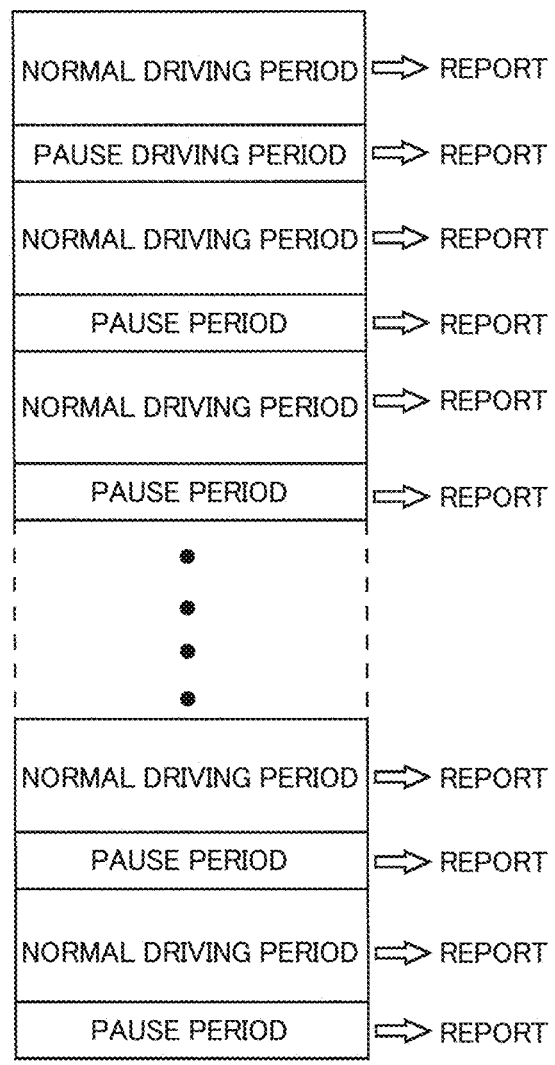
FIG. 3 is a diagram showing a timing of reporting a touch position when image displaying and touch position detection are alternately performed in a liquid crystal display device.

FIG. 3 is a diagram showing a timing of reporting a touch position when image displaying and touch position detection are alternately performed in the display device. As shown in FIG. 3, the display device alternately repeats the normal driving period in which the updated image is displayed on the display panel and a pause period in which the update of the image is paused and merely the touch position is detected by time division. The display device transmits the touch position to the host at a timing determined in each of the normal driving period and the pause period, as described later.

Figure 4:
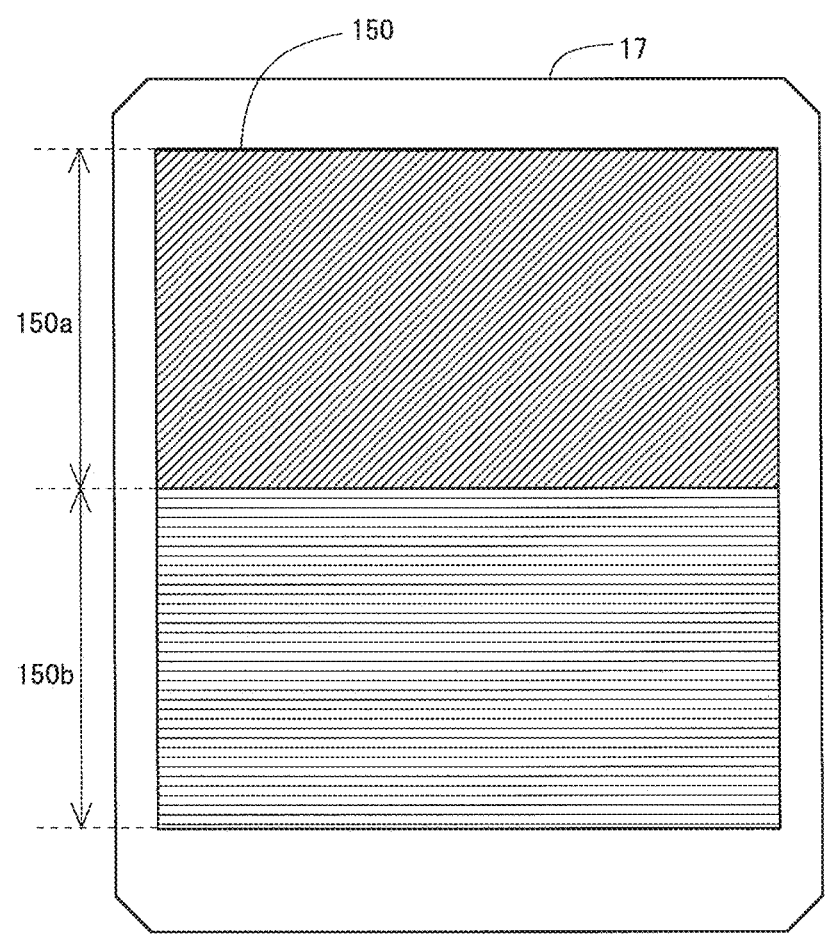
FIG. 4 is a diagram showing regions of a display unit of the display device.

FIG. 4 is a diagram showing each of regions 150a and 150b when an image is displayed on a display unit 150 of the display device. A case will be described in which an image is displayed on the display unit 150 divided into two regions 150a and 150b as shown in FIG. 4 by alternately repeating the LCD driving and the TP driving four times, for example, as shown in FIG. 1. First, in order to display the image in the region 150a, the LCD driving and the TP driving are alternately repeated twice, and coordinate reporting is performed after the second TP driving and fourth TP driving. Next, in order to display the image in the region 150b, the LCD driving and the TP driving are alternately repeated twice, and coordinate reporting is performed after the second TP driving and fourth TP driving. As a result, an image for one frame is displayed on the display unit 150 in the period of 16.66 msec (60 Hz) which is the normal driving period. The operation of displaying the image for one frame up to this point is to be performed in one set. Further, when the pause driving is performed, after displaying the image in the region 150b, the LCD pause period and the TP driving are alternately repeated four times as shown in FIG. 1, and the coordinate reporting is performed after the second TP driving and fourth TP driving. The case where the LCD driving and the TP driving are alternately repeated four times to display the image for one frame on the display unit 150 is merely an example, and the number of times the LCD driving and the TP driving are alternately repeated can be appropriately determined.

<3. Configuration of Display Device>

Figure 5:
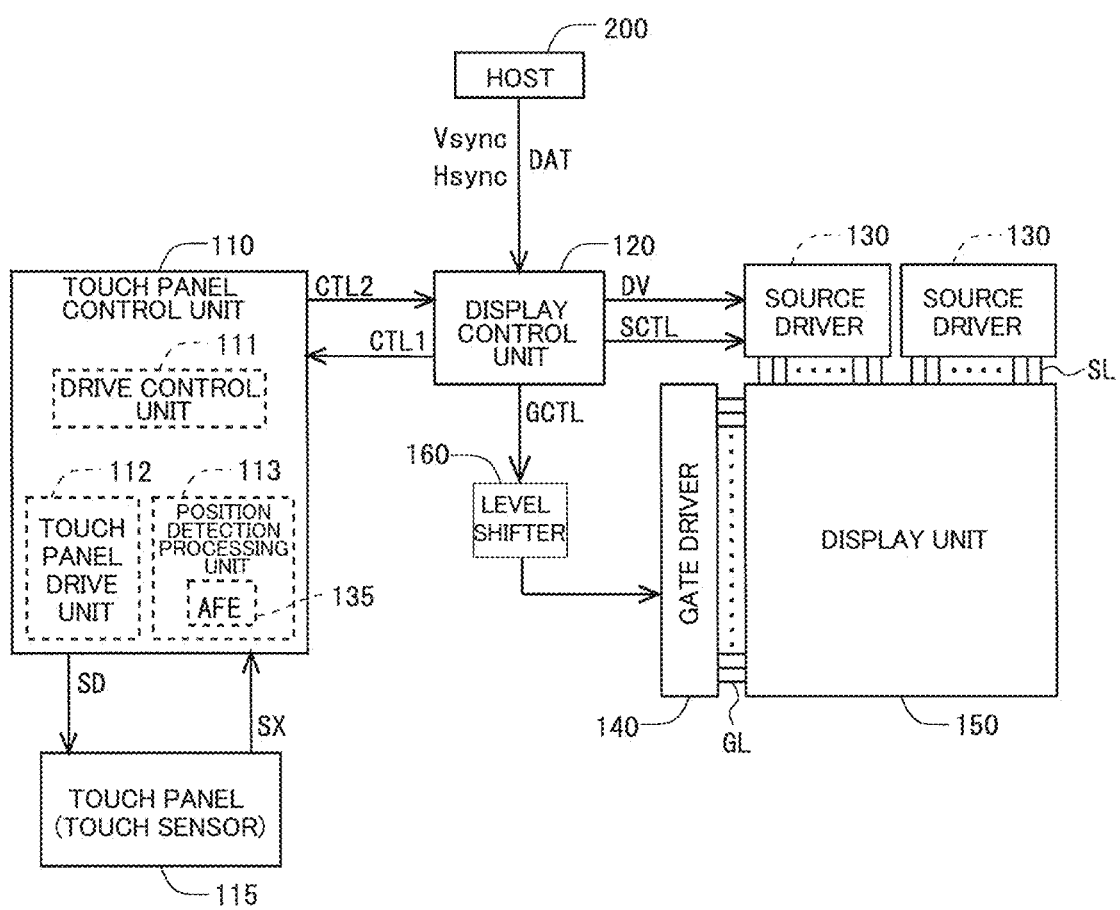
FIG. 5 is a block diagram showing a functional configuration of a display device with a built-in in-cell touch sensor according to an embodiment of the present invention.

FIG. 5 is a block diagram showing a functional configuration of a display device with a built-in in-cell touch sensor according to an embodiment of the present invention. This liquid crystal display device includes a touch panel control unit 110, a touch panel 115, a display control unit 120, a source driver 130, a gate driver 140, a display unit 150, and a level shifter 160. The touch panel control unit 110 and the touch panel 115 are components for detecting a touch position, and the display control unit 120, the source driver 130, the gate driver 140, the display unit 150, and the level shifter 160 are components for displaying an image. Since FIG. 5 is a diagram showing the functional configuration, it is noted that the positional relationship between the components is different from the actual positional relationship.

The touch panel control unit 110 includes a drive control unit 111, a touch panel drive unit 112, and a position detection processing unit 113. The touch panel control unit 110 controls the operation of the touch panel 115. In controlling, the touch panel drive unit 112 provides the touch panel 115 with a drive signal SD for detecting the touch position based on a control signal CTL1 provided from the display control unit 120. The control signal CTL1 is a signal for controlling the timing of detecting the touch position during the period when the process for displaying the image is not performed.

The touch panel 115 detects the touch position of the user. The timing of detecting the touch position is determined based on the drive signal SD provided from the touch panel control unit 110. The touch panel 115 provides a detection signal SX indicating a touch position to the touch panel control unit 110. When the detection signal SX indicating the detection result is provided from the touch panel 115 to the touch panel control unit 110, the position detection processing unit 113 detects the position where the touch panel 115 is touched based on the detection signal SX. The touch panel control unit 110 provides the control signal CTL2 to the display control unit 120 such that the process corresponding to the position where the touch is made is performed. An analog front end (AFE) 135 that processes the detection signal SX detected by the sensor electrode is included in the position detection processing unit 113. The position detection processing unit 113 determines whether or not there is a touch by the user based on the output from the AFE 135, and specifies the touch position. The driving method for displaying an image on the display unit 150 will be described later.

Figure 6:
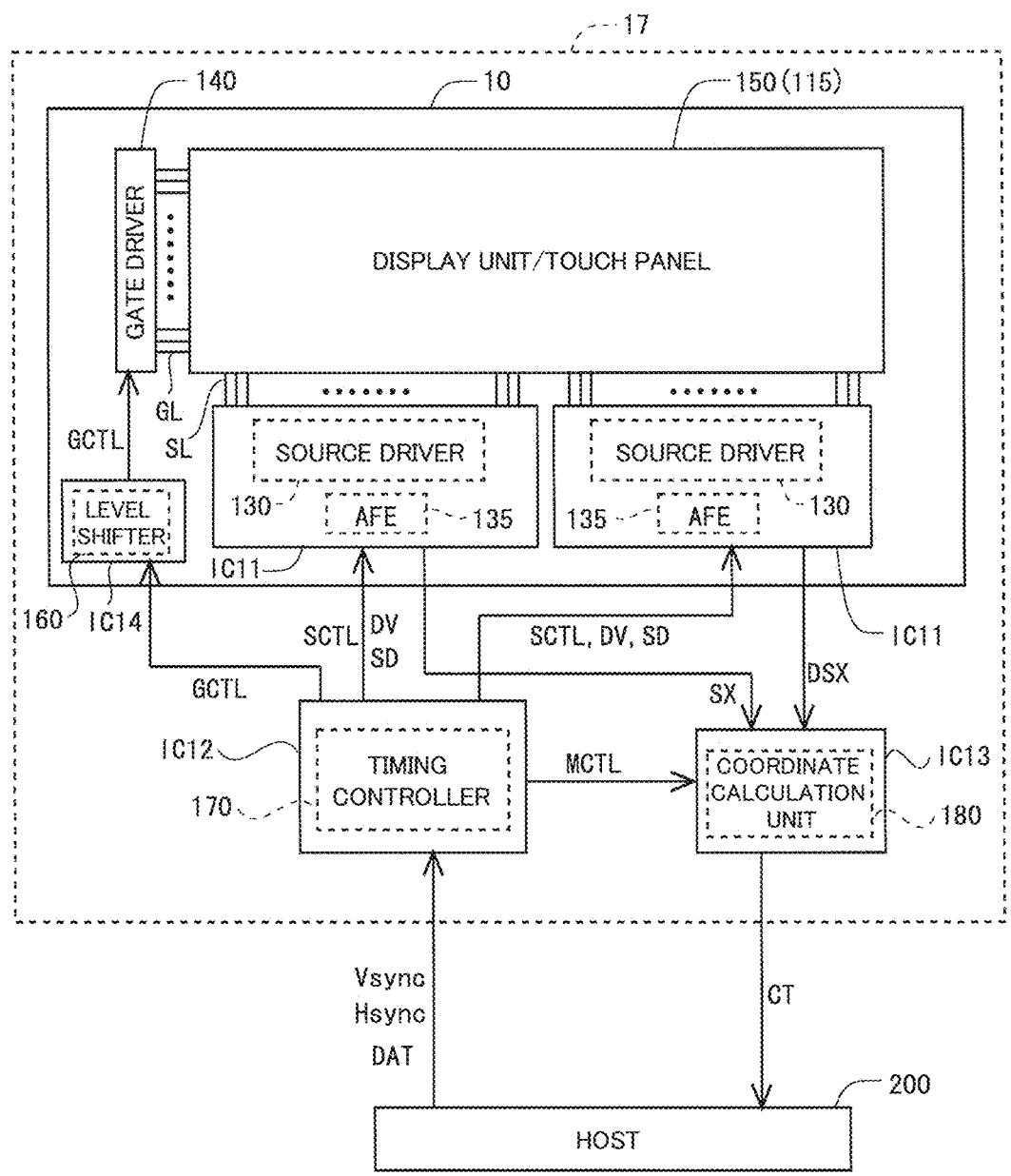
FIG. 6 is a diagram showing an arrangement of ICs used in a liquid crystal display device mounted on a personal computer (PC).

FIG. 6 is a diagram showing an arrangement of ICs used in a liquid crystal display device mounted on a personal computer (PC). The liquid crystal display device includes four ICs 11 to 14 constituting each component shown in FIG. 5 and a circuit formed on a substrate. The IC 11 has a function as the source driver 130 and a function as the position detection processing unit 113 including the AFE 135, and is provided on a TFT array substrate 10 that constitutes the liquid crystal panel 17. For example, in order to divide the display unit 150 into two regions to display an image in each region and detect the touch position of each region, the IC 11 is also disposed by being divided into two parts to correspond to two respective divided regions.

The IC 12 generates a source control signal SCTL and a gate control signal GCTL requested to display an image on the display unit 150 based on a vertical synchronization signal Vsync and a horizontal synchronization signal Hsync provided from the host 200, and provides the generated signals to the source driver 130 and the gate driver 140, respectively, or generates a drive signal SD for controlling the operation of the touch panel 115 and provide the drive signal to the touch panel 115. Further, the IC 12 receives image data DAT provided from the host 200, generates a digital image signal DV, and transmits the digital image signal DV to the source driver 130. In this way, the IC 12 has a function as a timing controller 170.

The IC 13 includes a memory controller unit (MCU) that calculates the coordinates of the touch position based on the detection signal SX detected by the AFE 135, and functions as the coordinate calculation unit 180. The coordinate calculation unit 180 obtains the coordinates CT of the touch position based on the digital detection signal DSX of the touch position provided from the AFE 135 of the IC 11 and the control signal MCTL provided from the IC 12, and transmits the coordinates to the host 200. The IC12 and the IC 13 are disposed on the back surface of the TFT array substrate 10 on which the IC 11 is provided, for example, through flexible printed circuits (FPC). The IC 14 functions as the level shifter 160, amplifies the gate control signal GCTL provided from the IC 12, and provides the amplified signal to the gate driver 140. The IC 12 to IC14 are provided on the liquid crystal panel 17.

On the TFT array substrate 10, the display unit 150, a portion functioning as the touch panel 115, and a circuit functioning as a gate driver 140 are formed. The gate driver 140 is constituted by a thin-film transistor (TFT), a resistance element, or the like, formed on the TFT array substrate 10, instead of the IC.

In addition, in a smartphone, the ICs 11 to 14 are often mounted in a single IC for miniaturization, but some of them may be separated.

The display unit 150 displays an image under the control of the source driver 130 and the gate driver 140. In the display unit 150, a plurality of source bus lines (data signal lines) SL and a plurality of gate bus lines (scanning signal lines) GL are arranged. A pixel formation unit that forms a pixel is provided corresponding to respective intersections of the plurality of source bus lines SL and the plurality of gate bus lines GL. In the display unit 150, a plurality of pixel formation units are arranged in a matrix.

Figure 7:
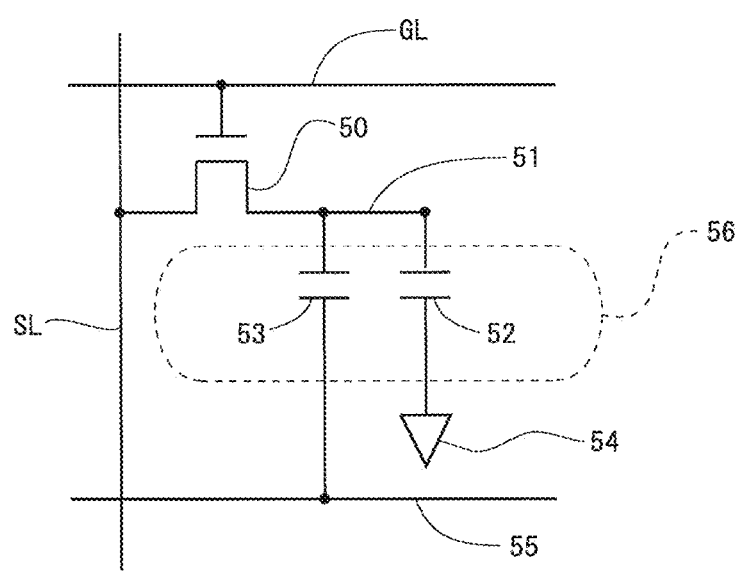
FIG. 7 is a circuit diagram showing a configuration of a pixel formation unit formed in a display unit.

FIG. 7 is a circuit diagram showing a configuration of a pixel unit (formed in the display unit). In each pixel formation unit, a TFT (pixel TFT) 50, which is a switching element in which a gate terminal is connected to a gate bus line GL passing through a corresponding intersection and a source terminal is connected to a source bus line SL passing through the intersection, a pixel electrode 51 connected to a drain terminal of the TFT 50, a common electrode 54 and an auxiliary capacitance electrode 55 that are provided in the plurality of pixel formation units in common, a liquid crystal capacity 52 formed by the pixel electrode 51 and the common electrode 54, and an auxiliary capacitance 53 formed by the pixel electrode 51 and the auxiliary capacitance electrode 55. The liquid crystal capacity 52 and the auxiliary capacitance 53 constitute a pixel capacitance 56.

As shown in FIGS. 5 and 6, the display control unit 120 receives the image data DAT transmitted from the host and the control signal CTL2 transmitted from the touch panel control unit 110, and outputs the digital image signal DV, the source control signal SCTL for controlling the operation of the source driver 130 and the gate control signal GCTL for controlling the operation of the gate driver 140. Examples of the source control signal SCTL include a source start pulse signal, a source clock signal, and a latch strobe signal. The gate control signal GCTL includes a gate start pulse signal, a gate clock signal, and the like.

The source driver 130 applies a driving image signal to each source bus line SL based on the digital image signal DV and the source control signal SCTL transmitted from the display control unit 120. In this case, the source driver 130 sequentially holds the digital image signal DV indicating a voltage to be applied to each source bus line SL at the timing when the pulse of the source clock signal is generated. Then, at the timing when the pulse of the latch strobe signal is generated, the held digital image signal DV is converted into an analog voltage. The converted analog voltage is simultaneously applied to all the source bus lines SL as a driving image signal.

The gate driver 140 repeats, based on the gate control signal GCTL transmitted from the display control unit 120, application of an active scanning signal to each gate bus line GL in a cycle of one vertical scanning period.

As described above, by applying the driving image signal to the source bus line SL and applying the scanning signal to the gate bus line GL, an image based on the image data DAT transmitted from the outside is displayed on the display unit 150. Further, when the position at which the touch panel 115 is touch is detected, the liquid crystal display device performs a process according to the touch position.

<4. About Sensor Pattern or the Like>

Figure 8:
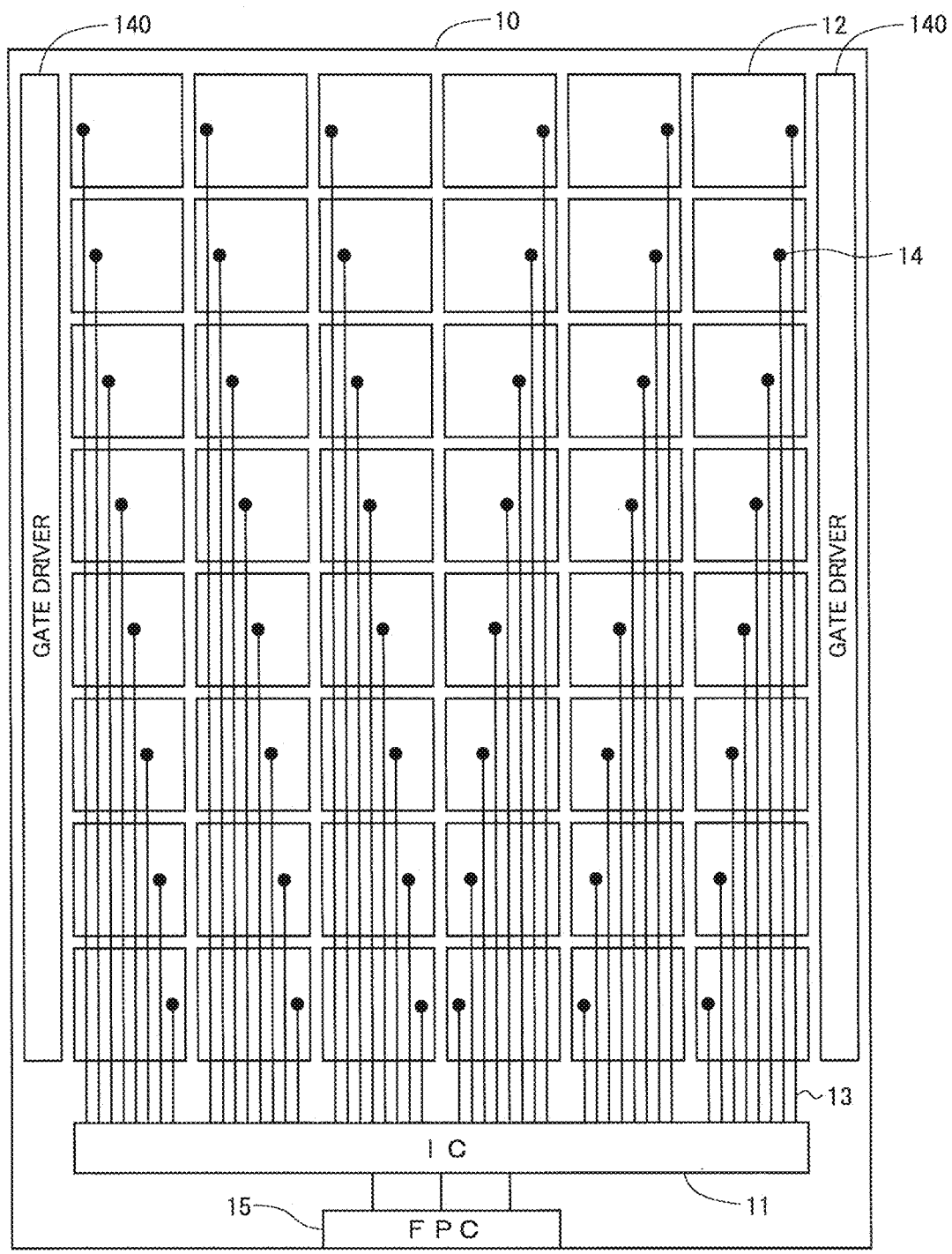
FIG. 8 is a diagram showing a configuration of sensor electrodes that constitute the touch panel according to the embodiment.

FIG. 8 is a diagram showing a configuration of sensor electrodes 12 that constitute the touch panel 115 according to the embodiment. The liquid crystal display device according to the embodiment employs an in-cell touch panel. The liquid crystal display device has a liquid crystal panel 17 including two glass substrates facing each other (TFT array substrate 10 and color filter substrate). A component for detecting a touch position is provided on the TFT array substrate 10 of the two glass substrates. As shown in FIG. 8, a sensor electrode (touch detection electrode) 12, a touch detection wire 13, an IC 11, and an FPC 15 are provided on the TFT array substrate 10. The IC 11 has a function as a source driver 130 and a function as the position detection processing unit 113 including the AFE, and is connected to an IC 13 through the FPC 15 to connect to the coordinate calculation unit 180. Further, a contact portion 14 for connecting the sensor electrode 12 and the touch detection wire 13 is provided on the TFT array substrate 10. Further, gate drivers 140 are formed on both left and right sides of the region where the plurality of sensor electrodes 12 are provided among regions on the TFT array substrate 10.

In the embodiment, one electrode functions as the common electrode 54 and also functions as the sensor electrode 12. The sensor electrode 12 is formed by dividing the common electrode 54 into a matrix. Each of the divided electrodes functions as the common electrode 54 when a process for displaying an image is performed, and functions as the sensor electrode 12 when a process for detecting a touch position is performed. As described above, by using the common electrode 54 for image displaying also as the sensor electrode 12, the thinner and lighter device is achieved.

One end of the touch detection wire 13 is connected to the contact portion 14 formed on the corresponding sensor electrode 12, and the other end of the touch detection wire 13 is connected to the IC 11. This makes it possible to apply the drive signal SD from the IC 11 to each sensor electrode 12 and specify the touch position based on the detection signal SX.

<5. Operation in Embodiment>

In the liquid crystal display device that performs low frame rate driving, the normal driving period and the pause period are alternately set. Since the image is updated at 60 Hz, the normal driving period is 16.66 msec. As already described above, since the touch position detected in the normal driving period is transmitted to the host once every time the TP driving is finished twice, the transmission is performed twice every normal driving period. When the vertical synchronization signal is not input from the host within the preset first setting period after the fourth TP driving is finished, the transition is performed from the normal driving period to the pause period.

The transmission of the touch position to the host in the pause period is performed once every time the TP driving is finished twice, as in the normal driving period. However, since the length of the pause period changes, the transmission to the host is not limited to twice depending on the length, for example, the transmission may be performed three times, one time, or no time.

Therefore, first to third examples in which the lengths of the pause periods are different will be described below. It is noted that the normal driving period is constant at 16.66 msec, and the LCD driving and the TP driving in the normal driving period have already been described, and the description thereof will be omitted.

When the vertical synchronization signal is not input within a preset period (also referred to as a "first setting period N1") from the end of the TP driving of the normal driving period, the transition to the pause period is performed. Further, in the pause period, when the vertical synchronization signal is not input within the first setting period N1, the length of the pause period is extended by a preset period (also referred to as a "second setting period N2"). Every time the pause period ends, it is determined whether or not the above condition is satisfied, and the pause period is extended every time it is determined that the above condition is satisfied. In the following description, it is assumed that the second setting period N2 is set to 16.66 msec.

Figure 9:
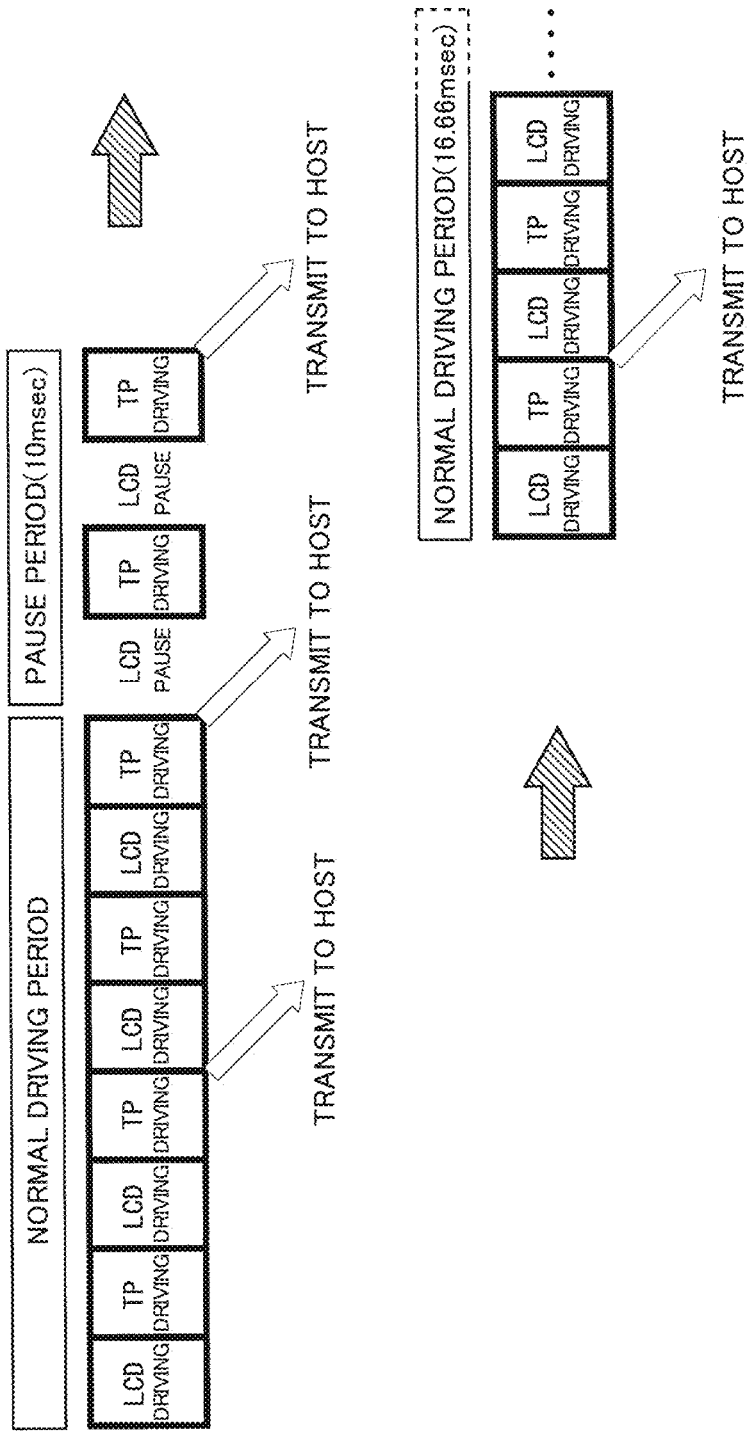
FIG. 9 is a diagram showing an operation of the liquid crystal display device when the pause period is 10 msec, which is shorter than 16.66 msec.

First, the first example will be described. FIG. 9 is a diagram showing an operation of the liquid crystal display device when the pause period is 10 msec, which is shorter than 16.66 msec. As shown in FIG. 9, the TP driving is performed only twice since the pause period is as short as 10 msec. In this case, the detected touch position is transmitted once at the end of the second TP driving, and then the vertical synchronization signal is input from the host within the first setting period N1. When the vertical synchronization signal is input, the coordinate calculation unit 180 included in the IC 13 operates normally without abnormal operation, and the liquid crystal display device interrupts the pause period to transition to the normal driving period. As a result, the LCD driving is performed based on the digital image signal DV input subsequent to the vertical synchronization signal. In this case, the average report rate in the normal driving period and the pause period is 112.5 Hz as represented by the following equation (2). This average report rate is slower than the standard report rate of 120 Hz when the pause period is 16.66 msec. However, since the report rate is faster than 80 Hz, which is sometimes pointed out by the user as feeling that the response is slow, it is at a level that is not an issue in practical use.

$$1/((16.66+10)/3)=112.5 \text{ Hz} \tag{2}$$

Figure 10:
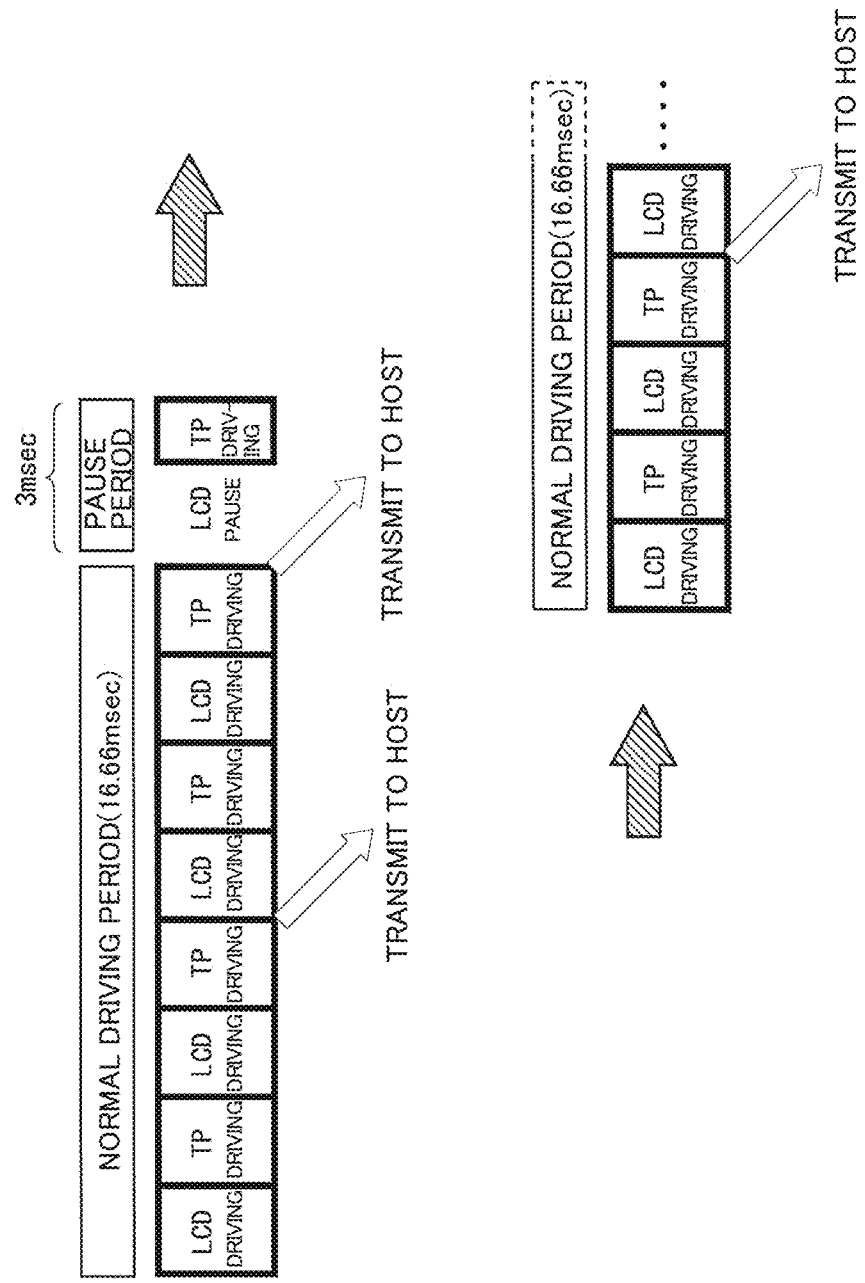
FIG. 10 is a diagram showing an operation of the liquid crystal display device when the pause period is 3 msec, which is shorter than that shown in FIG. 9.

Next, a second example will be described. FIG. 10 is a diagram showing an operation of the liquid crystal display device when the pause period is 3 msec, which is shorter than that shown in FIG. 9. As shown in FIG. 10, when the vertical synchronization signal is input from the host while performing the TP driving once in the pause period, the coordinate calculation unit 180 operates normally without abnormal operation, and the liquid crystal display device stops the TP driving and transitions from the pause period to the normal driving period. In this case, the coordinates of the touch position processed in the IC 13 remaining in the coordinate calculation unit 180 in the interrupted TP driving may be a cause of malfunction, and thus the calculated coordinates are discarded. For this reason, the coordinate calculation unit 180 operates normally without abnormal operation. As a result, the liquid crystal display device transitions from the pause period to the normal driving period, and performs the LCD driving based on the digital image signal DV input subsequent to the vertical synchronization signal. In this case, the average report rate in the normal driving period and the pause period is 101.7 Hz as represented by the following equation (3), which is slower than the standard report rate of 120 Hz. However, since the report rate is faster than 80 Hz, which is sometimes pointed out by the user as feeling that the response is slow, it is at a level that is not an issue in practical use.

$$1/((16.66+3)/2)=101.7\ \text{Hz} \quad (3)$$

Figure 11:
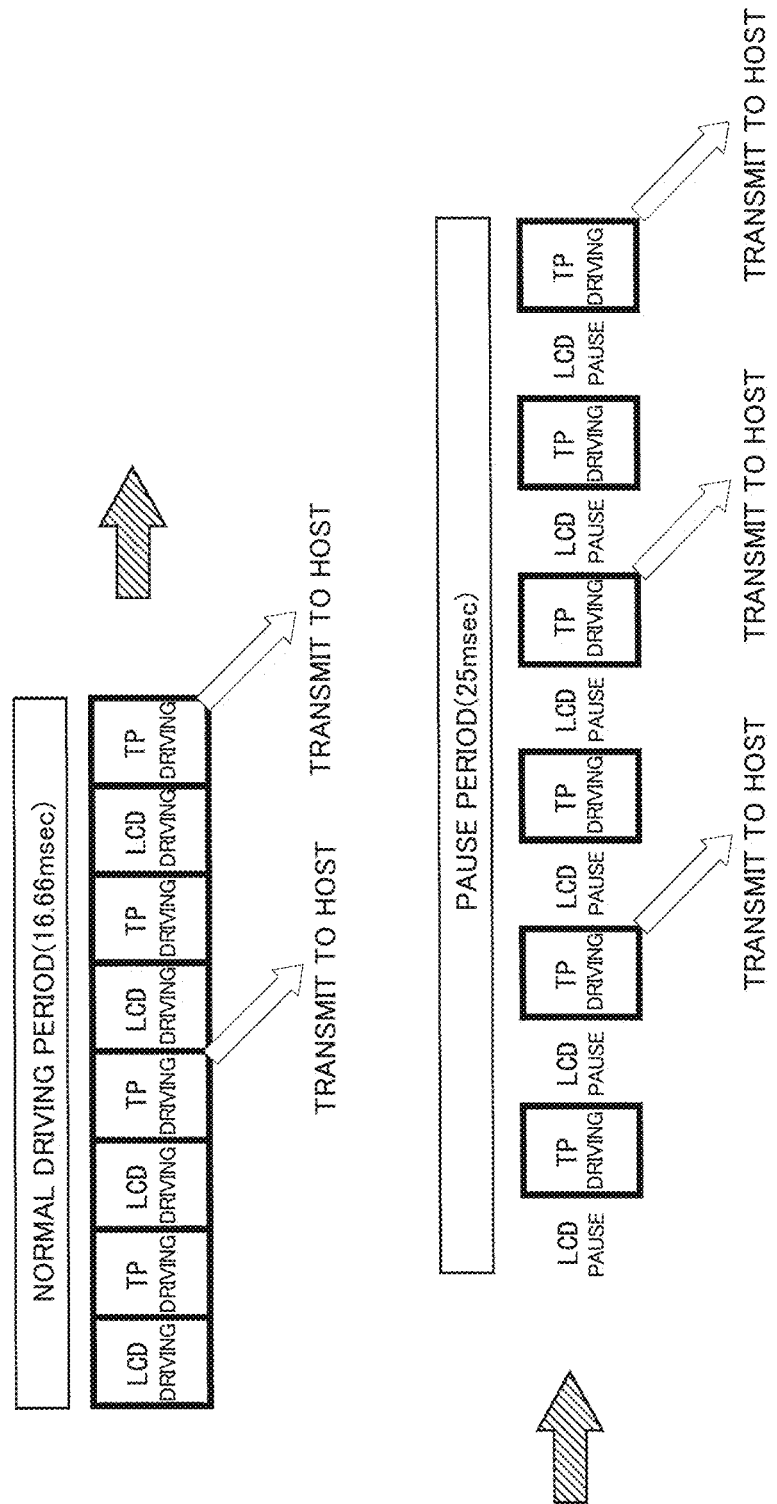
FIG. 11 is a diagram showing an operation of the liquid crystal display device when the pause period is 25 msec, which is longer than 16.66 msec.

Next, a third example will be described. FIG. 11 is a diagram showing an operation of the liquid crystal display device when the pause period is 25 msec, which is longer than 16.66 msec. As shown in FIG. 11, the touch position is transmitted twice by 16.66 msec in the pause period. Since the vertical synchronization signal is not input within the first setting period N1 from the end of the fourth TP driving, the pause period is extended by 16.66 msec which is the second setting period N2 after the elapse of the first setting period N1. Then, when the vertical synchronization signal is input from the host after the second TP driving is finished, the coordinate calculation unit 180 operates normally without abnormal operation. As a result, the liquid crystal display device transitions to the normal driving period and performs the LCD driving based on the image data input subsequent to the vertical synchronization signal. In this case, the average report rate in the normal driving period and the pause period is 120.0 Hz as represented by the following equation (4), which is the same as the standard report rate of 120 Hz, and thus there is no problem.

$$1/((16.66+25)/5)=120.0\ \text{Hz} \quad (4)$$

<6. Flowchart Showing Operations in Normal Driving Period and Pause Period>

Figure 12:
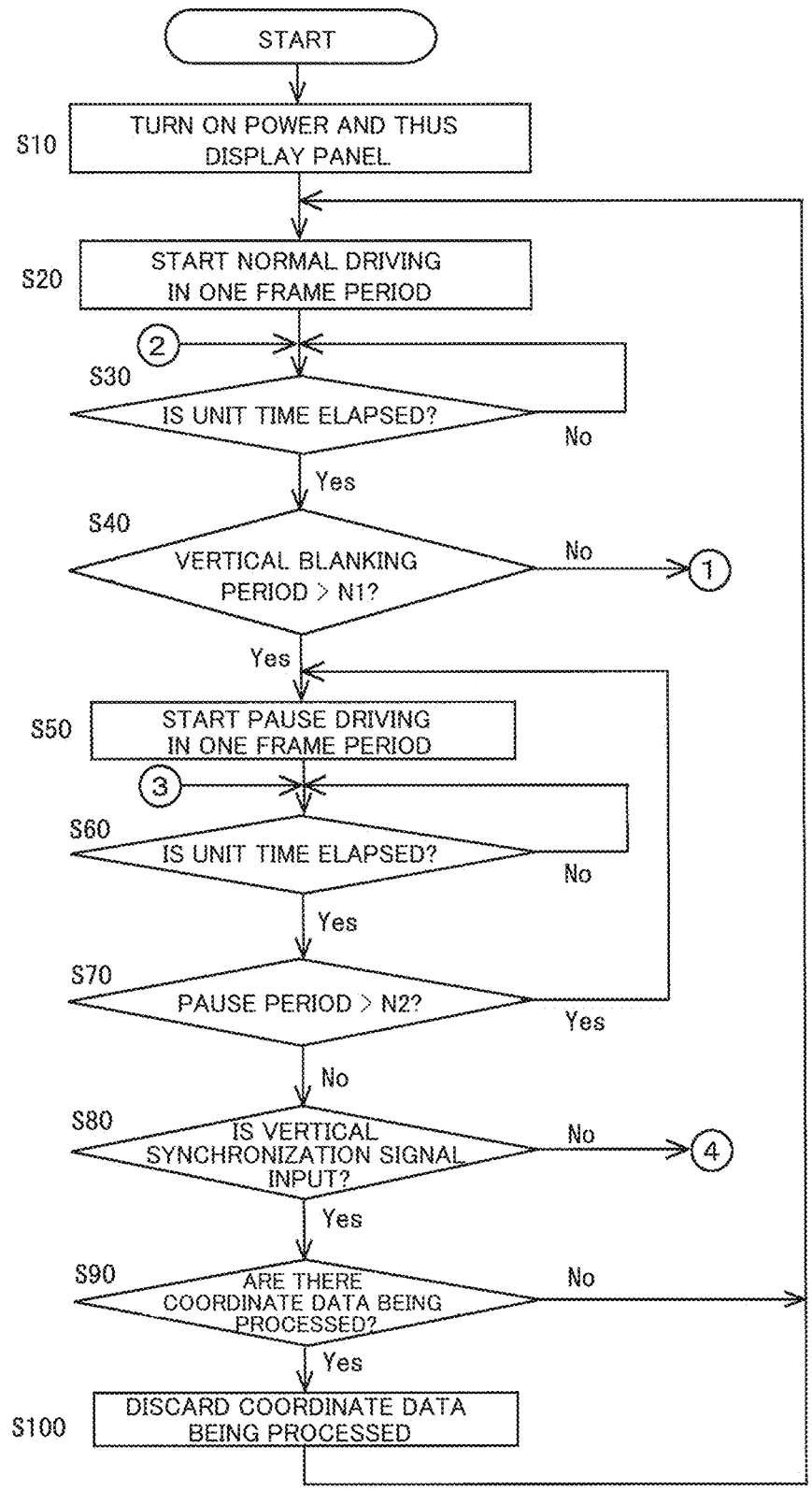
FIG. 12 is a flowchart showing a part of an operation of a liquid crystal display device which performs variable low frame rate driving in which a length of the pause period changes.
Figure 13:
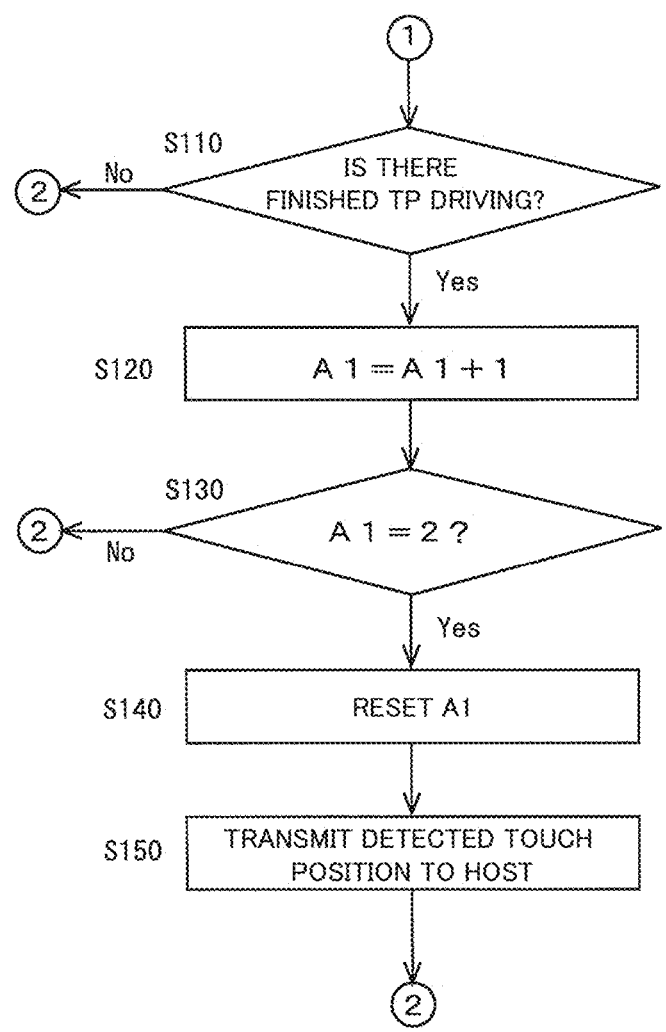
FIG. 13 is a flowchart showing a part of the operation of the liquid crystal display device which performs the variable low frame rate driving in which the length of the pause period changes.
Figure 14:
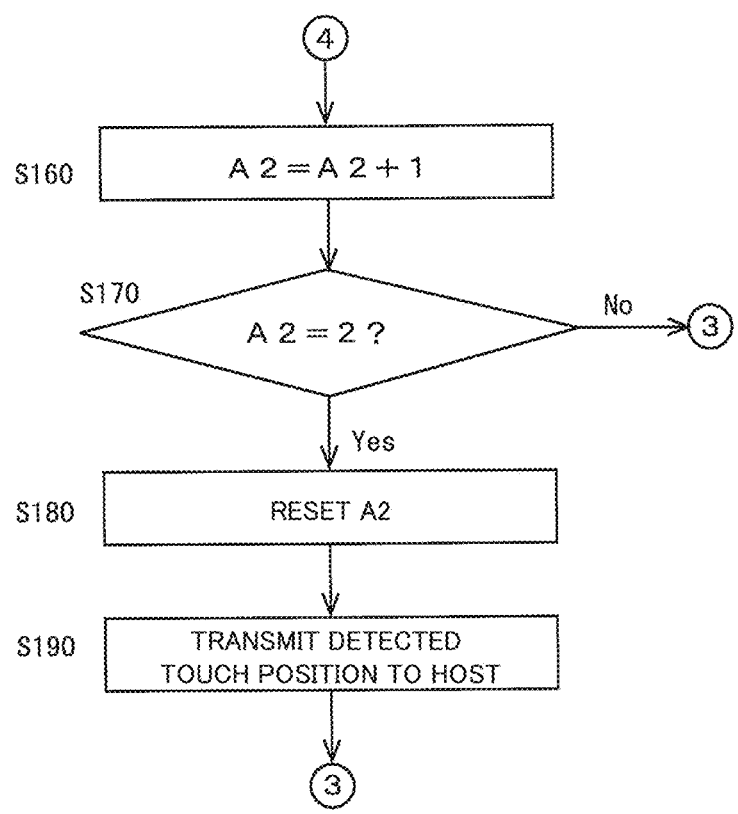
FIG. 14 is a flowchart showing a part of the operation of the liquid crystal display device which performs the variable low frame rate driving in which the length of the pause period changes.

FIGS. 12 to 14 are flowcharts showing the operation of the liquid crystal display device which performs the variable low frame rate driving in which the length of the pause period changes. As shown in FIGS. 12 to 14, in step S10, the power of the liquid crystal display device is turned on, and thus the display panel is set to a displayable mode. In step S20, the normal driving for one frame period is started. In this way, the normal driving, which alternately repeats the LCD driving and the TP driving four times, is started.

In step S30, the process waits until a predetermined unit time (for example, 1 μsec) elapses. When the predetermined unit time elapses, it is determined in step S40 whether or not the vertical blanking period is longer than the first setting period N1. When the determination result is affirmative, the process proceeds to step S50 to be described below. On the other hand, when the determination result is negative, the process proceeds to step S110.

In step S110, it is determined whether or not there is a finished TP driving. When the determination result is negative, the process returns to step S30. On the other hand, when the determination result is affirmative, the process proceeds to step S120 to increment, by 1, the value of the first counter A1 that counts the number of times of the TP driving, and the process proceeds to step S130.

In step S130, it is determined whether or not the value of the first counter A1 is 2, and when the determination result is negative, the process returns to step S30. On the other hand, when the determination result is affirmative, the value of the first counter A1 is reset in step S140. Further, in step S150, the detected touch position is transmitted to the host, and the process returns to step S30.

In step S30, the process waits until the unit time (for example, 1 μsec) elapses. When the unit time elapses, it is determined in step S40 whether the vertical blanking period is longer than the first setting period N1. When the determination result is negative, the process proceeds to step S110 above. Since the steps after step S110 overlaps with the above description, the description thereof is omitted.

On the other hand, when the determination result is affirmative in step S40, the process proceeds to step S50, and pause driving for one frame period is started. In this way, the pause driving, which alternately repeats the LCD pause and the TP driving, is started. In step S60, the process waits until a predetermined unit time (for example, 1 μsec) elapses. When the predetermined unit time has elapsed, it is determined in step S70 whether or not the pause period after the second TP driving is finished is longer than the second setting period N2. When the determination result is affirmative, the process returns to step S50 to start the pause driving for a new one frame period. On the other hand, when the determination result is negative, the process proceeds to step S80.

In step S80, it is determined whether or not a vertical synchronization signal has been input from the host. When the determination result is affirmative, the process proceeds to step S90 to be described below. On the other hand, when the determination result is negative, the process proceeds to step S160.

In step S160, the value of the second counter A2 that counts the number of times the TP driving is performed incremented by 1, and the process proceeds to step S170. In step S170, it is determined whether or not the value of the second counter A2 is 2, and when the determination result is negative, the process returns to step S60. On the other hand, when the determination result is affirmative, the value of the second counter A2 is reset in step S180, the detected touch position is transmitted to the host in step S190, and then the process returns to step S60.

When it is determined to be affirmative in step S80 described above, the process proceeds to step S90. In step S90, it is determined whether or not the coordinates being processed remains in the coordinate calculation unit MCU. When the determination result is negative, the process returns to step S20 to start normal driving of a new frame. On the other hand, when the determination result is affirmative, the process proceeds to step S100, the coordinate data being processed that remains in the coordinate calculation unit MCU is discarded, and the process returns to step S20 to start normal driving of a new frame. Similarly, the operations from step S20 are repeated as described above.

<7. Effects>

Since the touch panel control unit 110 repeatedly detects the touch position at a predetermined interval until the vertical synchronization signal is input in the pause period, it is possible to prevent an abnormal operation even when the pause period is extended. Further, when the vertical synchronization signal is received in the pause period, the pause period is interrupted to transition to the normal driving period, and the updated image is displayed. Further, when the length of the pause period exceeds the preset second setting period N2, the touch panel control unit 110 extends the pause period by using the second setting period N2 as a unit.

Thus, it is possible to extend the pause period any number of times when the vertical synchronization signal is not to be received in the pause period.

Furthermore, the touch panel control unit 110 interrupts the detection of the touch position and specification of the coordinates when the vertical synchronization signal is received while specifying the coordinates of the touch position, and discards data regarding coordinates remaining in the coordinate calculation unit 180. This makes it possible to prevent abnormal operation. In addition, the transition is automatically performed from the normal driving period to the pause period when it is determined that the period from when the normal driving period has elapsed until the vertical synchronization signal is input is longer than the first setting period N1. This makes it possible that the transition from the normal driving period to the pause period is smoothly performed.

Although the present invention has been described in detail above, the above description is illustrative in all aspects and not restrictive. It is understood that numerous other modifications and variations can be conceived without departing from the scope of the present invention.

The invention claimed is:

1. A display device with a built-in touch sensor, which includes a display unit displaying an image, and displays an image on the display unit by low frame rate driving in which a length of a pause period is changed for each frame, detects whether or not the display unit is touched, and specifies and outputs coordinates of a touch position, the display device comprising:
   a plurality of sensor electrodes provided on the display unit;
   a control unit that generates a drive signal driving the sensor electrodes and applies the drive signal to the sensor electrodes to detect the touch position of the display unit;
   a plurality of analog front ends that process a detection signal obtained from the sensor electrodes; and
   a coordinate calculation unit that is controlled by the control unit and that specifies and outputs the coordinates of the touch position based on the detection signal obtained from the analog front ends, wherein
   the control unit repeats the detection of the touch position at a predetermined interval until a vertical synchronization signal is input in the pause period;
   the control unit interrupts the pause period to transition to a normal driving period for displaying an updated image when the vertical synchronization signal is received in the pause period, and causes the updated image to be displayed based on image data received following the vertical synchronization signal;
   the control unit sets the length of the pause period to a predetermined period in advance and extends the pause period by repeating the extension of the pause period by using the predetermined period as a unit when the vertical synchronization signal is not received even after the predetermined period has elapsed;
   the control unit interrupts the detection of the touch position by the sensor electrodes and the specifying of the coordinates when the vertical synchronization signal is received while specifying the coordinates of the touch position, and discards data regarding the specified coordinates remaining in the coordinate calculation unit; and
   the control unit determines that there is a transition from the normal driving period to the pause period when it is determined that a period from when the normal driving period has elapsed until the vertical synchronization signal is input is longer than a preset period.

2. A driving method for a display device with a built-in touch sensor, the display device including a display unit displaying an image on the display unit, displaying an image by low frame rate driving in which a length of a pause period is changed for each frame, detecting whether or not the display unit is touched, and specifying and outputting coordinates of a touch position, and the display device including a plurality of sensor electrodes provided on the display unit, a plurality of analog front ends that process a detection signal obtained from the sensor electrodes and a coordinate calculation unit that specifies and outputs the coordinates of the touch position based on the detection signal obtained from the analog front ends, the method comprising:
   generating a drive signal driving the sensor electrodes and applying the drive signal to the sensor electrodes to detect the touch position of the display unit;
   repeating detection of the touch position at a predetermined interval until a vertical synchronization signal is input, in the pause period;
   interrupting the pause period to transition to a normal driving period for displaying an updated image when the vertical synchronization signal is received in the pause period, and causing the updated image to be displayed based on image data received following the vertical synchronization signal;
   setting the length of the pause period to a predetermined period in advance and extending the pause period by repeating the extension of the pause period by using the predetermined period as a unit when the vertical synchronization signal is not received even after the predetermined period has elapsed;
   interrupting the detection of the touch position by the sensor electrodes and the specifying of the coordinates when the vertical synchronization signal is received while specifying the coordinates of the touch position, and discarding data regarding the specified coordinates remaining in the coordinate calculation unit; and
   determining that there is a transition from the normal driving period to the pause period when it is determined that a period from when the normal driving period has elapsed until the vertical synchronization signal is input is longer than a preset period.

* * * * *